(12) United States Patent
Su et al.

(10) Patent No.: US 6,936,807 B1
(45) Date of Patent: Aug. 30, 2005

(54) LIGHT-RESPONSIVE CONTROL DEVICE OF ELECTROCHROMIC REARVIEW MIRROR SYSTEM

(75) Inventors: Wen-Wei Su, Taoyuan (TW);
Kuei-Hung Chen, Taoyuan (TW);
Shun-Hsiang Hsiao, Taoyuan (TW)

(73) Assignee: Exon Science, Inc., Taoyuan (TW)

( * ) Notice: Subject to any disclaimer, the term of this patent is extended or adjusted under 35 U.S.C. 154(b) by 180 days.

(21) Appl. No.: 09/945,881

(22) Filed: Sep. 4, 2001

(51) Int. Cl.$^7$ .............................................. H01J 40/14
(52) U.S. Cl. .................... 250/214 R; 359/267; 359/604
(58) Field of Search .................... 250/214 R, 206, 250/201.1, 204, 208.1; 359/265, 267, 601–604

(56) References Cited

U.S. PATENT DOCUMENTS

| | | | |
|---|---|---|---|
| 4,896,030 A | * | 1/1990 | Miyaji ........................ 250/206 |
| 4,917,477 A | * | 4/1990 | Bechtel et al. ............... 359/267 |
| 5,122,647 A | | 6/1992 | Lynam et al. |
| 5,424,898 A | | 6/1995 | Larson et al. |
| 5,550,677 A | * | 8/1996 | Schofield et al. ............ 359/604 |
| 5,659,423 A | * | 8/1997 | Schierbeek et al. .......... 359/604 |
| 5,760,962 A | * | 6/1998 | Schofield et al. ............ 359/604 |

FOREIGN PATENT DOCUMENTS

TW                461402              2/1989

* cited by examiner

Primary Examiner—Thanh X. Luu
Assistant Examiner—Stephen Yam
(74) Attorney, Agent, or Firm—Volpe and Koenig, P.C.

(57) ABSTRACT

A light-responsive control device of an electrochromic rearview mirror system is disclosed. The light-responsive control device includes a discriminating circuit for generating a first and a second reference levels provided for daytime and nighttime glaring determination, respectively. By providing a photo-sensor for each rearview mirror, and individually comparing the outputs of the photo-sensors with the first or the second reference level, the color-change degrees of different rearview mirrors can be individually controlled. By providing a variable resistor for the drive circuit, the initial reflection rate of the rearview mirror can be adjusted optionally.

4 Claims, 5 Drawing Sheets

LIGHT-RESPONSIVE CONTROL DEVICE OF ELECTROCHROMIC REARVIEW MIRROR SYSTEM

FIELD OF THE INVENTION

The present invention relates to a control device, and more particular to a light-responsive control device of an electrochromic rearview mirror system of a vehicle.

BACKGROUND OF THE INVENTION

Figure 1:
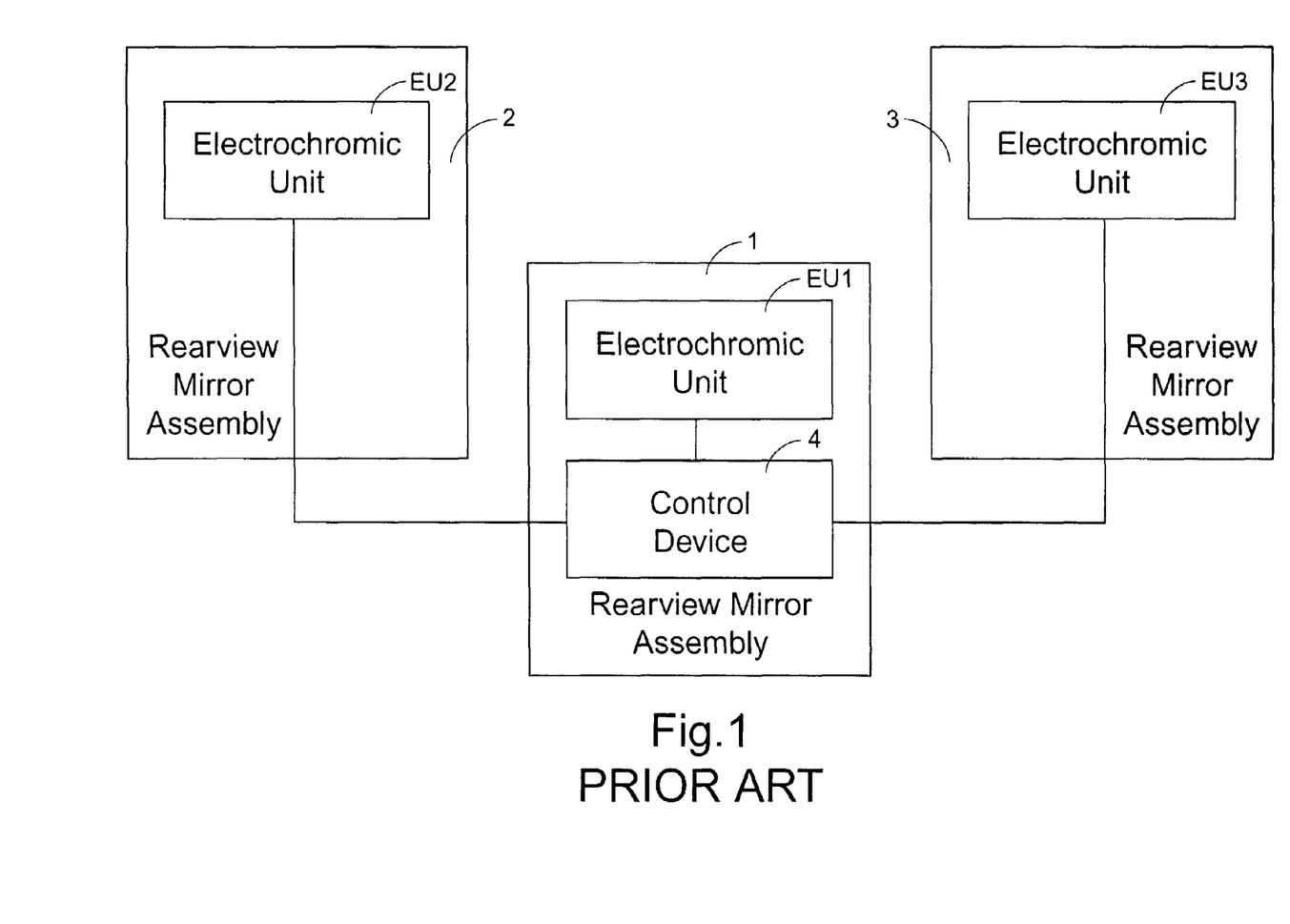
FIG. 1 is a schematic block diagram showing a conventional electrochromic rearview mirror system.

Glare is one of the troublesome factors when driving a vehicle. Many efforts have been made to solve the glaring problem. One of the most effective ways is to provide an electrochromic unit for the rearview mirror of the vehicle. The electrochromic unit deepens the color and thus reduces the reflection rate of the mirror accord to the degree of the glare, thereby minimizing the glaring effect. FIG. 1 is a schematic block diagram showing a conventional electrochromic rearview mirror system. The rearview mirror system includes an interior rearview mirror assembly 1 inside the vehicle, two exterior rearview mirror assemblies 2 and 3 by two sides of the vehicle, respectively, and a control device 4. Each of the rearview mirror assemblies 1, 2 and 3 includes an electrochromic unit EU1, EU2, EU3 which performs color change of the mirror under the control of the control device 4.

Figure 2:
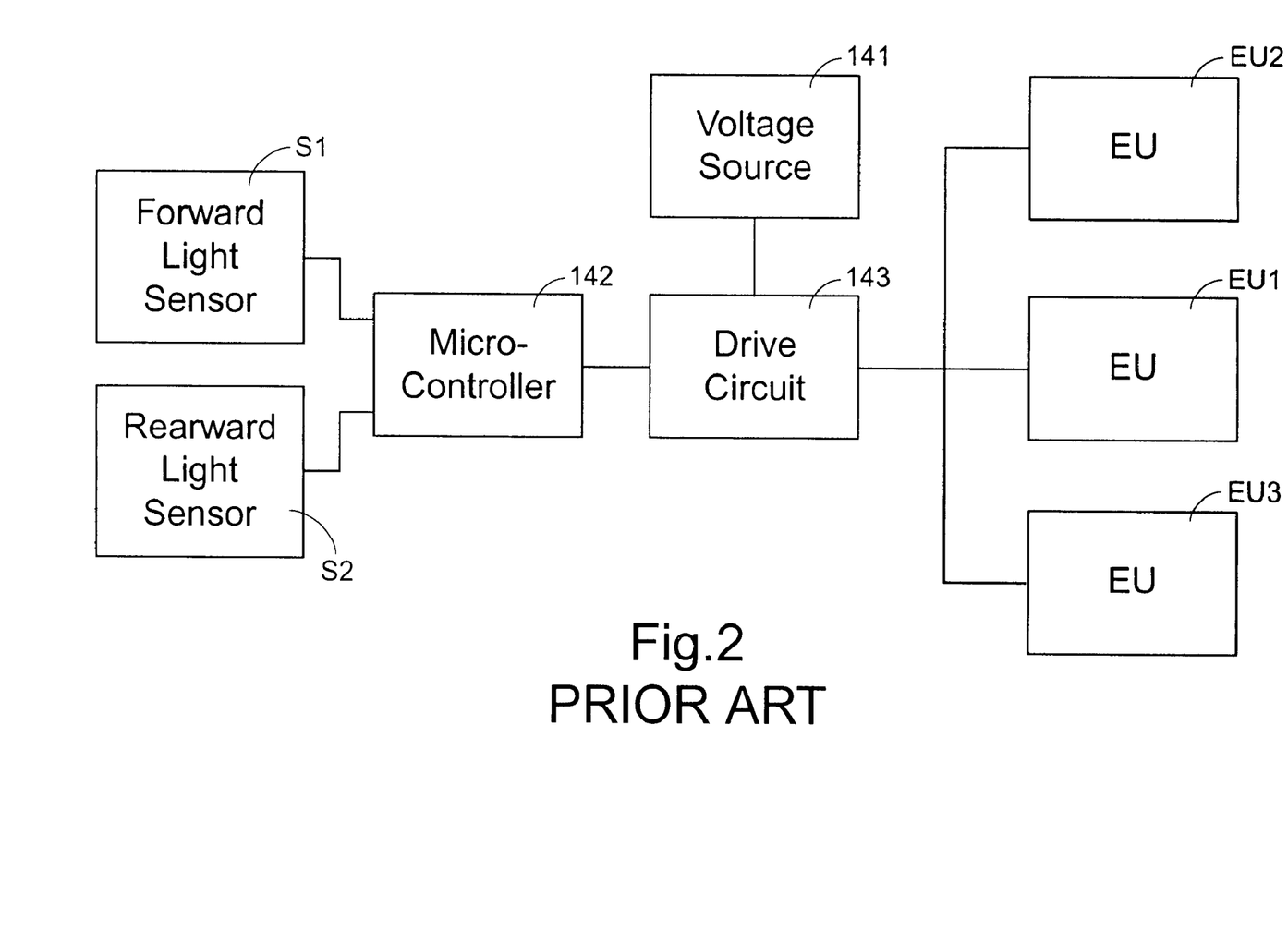
FIG. 2 is a schematic block diagram showing a control device of the conventional electrochromic rearview mirror system of FIG. 1.

Further referring to FIG. 2, the control device 4 includes a forward light sensor S1, a rear light sensor S2, a voltage source 141, a micro-controller 142 and a drive circuit 143. The sensors S1 and S2 are disposed at the forward and rearward sides of the interior rearview mirror assembly 1 for detecting the intensities of the forward light and rear light, respectively. First of all, the micro-controller 142 determines whether it is daytime or nighttime according to the forward light intensity detected by the sensor S1. For example, when the intensity of the forward light is detected to be greater than 50 Lux, it is determined to be daytime, and the micro-controller 142 disables the drive circuit 143. On the contrary, if the forward light is no greater than 50 Lux, the micro-controller 142 further determines whether a glaring situation occurs in response to the light intensity difference detected by the sensors S1 and S2, and controls the drive circuit 143 to apply a suitable voltage to all of the three electrochromic units EU1, EU2 and EU3 to change the color of the mirrors to a relatively low reflection rate when a glaring situation occurs.

The drive circuit 143 receives a voltage from the voltage source 141 which is the ignition or the vehicle battery voltage. The voltage is reduced to a level suitable for the electrochromic purpose, e.g. a voltage ranged between 0 and 3.5V, and provided for the electrochromic units EU1, EU2 and EU3 under the control of the micro-controller 142. The higher the voltage level is applied to the electrochromic unit, the deeper the color of the mirror is, and the lower the reflection rate of the mirror becomes. The reflection rate is lowered from an uncolored initial level, e.g. 55% in general.

The conventional electrohromic rearview mirror system as mentioned above, in spite of solving some glaring problems, cannot solve the problems thoroughly. For instance, in addition to the headlight of an oncoming vehicle, sunrise or sunset sunlight is another important glaring source. The rear sunlight results in powerful stimulation for eyes. The above-mentioned electrochromic mechanism does not work in daytime, so the glaring effect resulting from sunlight cannot be avoided.

On the other hand, when a glaring situation occurs, the three electrochromic units are activated simultaneously. In other words, when the sensor S2 at the interior rearview mirror detects a high intensity headlight from an oncoming vehicle right behind the user's vehicle, all the three mirrors change colors. Meanwhile, if the user would like to change to a right lane or a left lane, the colored exterior mirrors will have adversely effect on the observation of the other lanes. On the contrary, when a vehicle with a high intensity headlight is approaching the user's vehicle at the right or left side, it is possible for the sensor S2 to detect no glare so that all the three mirrors remains highly reflective. However, in fact, the right or left rearview mirror has been bothered by the glare.

Furthermore, the uncolored initial reflection rate 55% is generally suitable for the daytime viewing, but a little insufficient for some people with weaker sight in the dark. When the mirrors are darkened by the glare, the night-vision problem is even more serious.

SUMMARY OF THE INVENTION

Therefore, an object of the present invention is to provide a light-responsive control device of an electrochromic rearview mirror system, which covers but distinguishes the glare situations at daytime and nighttime.

Another object of the present invention is to provide a light-responsive control device of an electrochromic rearview mirror system, which independently controls the color-change of the rearview mirrors at different locations.

A further object of the present invention is to provide a light-responsive control device of an electrochromic rearview mirror system, which allows each of the rearview mirrors to have an adjustable initial reflection rate.

A first aspect of the present invention relates to a light-responsive control device of an electrochromic rearview mirror system of a vehicle. The electrochromic rearview mirror system includes a first rearview mirror and a first electrochromic unit for changing a reflection rate of the first rearview mirror in response to a voltage applied thereto. The light-responsive control device includes a first photo-sensor disposed at a front side of the first rearview mirror for generating a first signal in response to an intensity of a forward light reaching the first rearview mirror; a second photo-sensor disposed at a back side of the first rearview mirror for generating a second signal in response to an intensity of a rear light reaching the first rearview mirror; a discriminating circuit electrically connected to the first and second photo-sensors, determining which of a first and a second predetermined signals to serve as a reference signal in response to the first signal, and generating a first adjusting signal in response to a comparing result of the second signal and the reference signal; and a drive circuit electrically connected to the discriminating circuit and the first electrochromic unit for providing a first variable drive voltage for the first electrochromic unit in response to the first adjusting signal.

In an embodiment, the discriminating circuit includes a first comparing unit electrically connected to the first photo-sensor for comparing the first signal with a third predetermined signal to determine which of the first and second predetermined signals to serve as the reference signal; and a second comparing unit electrically connected to the second photo-sensor and the first comparing unit for comparing the second signal with the reference signal to generate the first adjusting signal.

In an embodiment, the drive circuit includes a voltage source for providing an initial voltage signal; a voltage-reducing unit electrically connected to the voltage source for reducing the initial voltage signal to a range covering the first variable voltage signal; and a charge/discharge unit electrically connected to the discriminating circuit, the voltage-reducing unit and the first electrochromic unit for charging/discharging the first electrochromic unit in response to the first adjusting signal.

Preferably, the light-responsive control device further includes a third photo-sensor disposed at a driver's side outside the vehicle for generating a third signal in response to an intensity of a rear light reaching a second rearview mirror of the electrochromic rearview mirror system; and a fourth photo-sensor disposed at a passenger's side outside the vehicle for generating a fourth signal in response to an intensity of a rear light reaching a third rearview mirror of the electrochromic rearview mirror system. The discriminating circuit is further electrically connected to the third and fourth photo-sensors, and generates a second adjusting signal in response to a comparing result of the third signal and the reference signal, and a third adjusting signal in response to a comparing result of the fourth signal and the reference signal. The drive circuit provides a second and a third variable drive voltages for the second and third electrochromic units in response to the second and third adjusting signals, respectively. Under this circumstances, more preferably, the discriminating circuit includes a first comparing unit electrically connected to the first photo-sensor for comparing the first signal with a third predetermined signal to determine which of the first and second predetermined signals to serve as the reference signal; a second comparing unit electrically connected to the second photo-sensor and the first comparing unit for comparing the second signal with the reference signal to generate the first adjusting signal; a third comparing unit electrically connected to the third photo-sensor and the first comparing unit for comparing the third signal with the reference signal to generate the second adjusting signal; and a fourth comparing unit electrically connected to the fourth photo-sensor and the first comparing unit for comparing the fourth signal with the reference signal to generate the third adjusting signal.

In an embodiment, the drive circuit includes three charge/discharge units which are electrically connected between the second, third and fourth comparing units and the first, second and third electrochromic units for charging/discharging the first, second and third electrochromic units in response to the first, second and third adjusting signals, respectively.

In another embodiment, the drive circuit includes three charge/discharge units which are electrically connected between the second comparing unit and the first, second and third electrochromic units for charging/discharging the first, second and third electrochromic units in response to the first adjusting signal.

Preferably, the light-responsive control device further includes a reflectance-adjusting unit, e.g. a variable resistor, between the drive circuit and the first electrochromic unit for determining a maximum reflection rate of the first electrochromic unit.

A second aspect of the present invention relates to another light-responsive control device of an electrochromic rearview mirror system of a vehicle. The electrochromic rearview mirror system includes a first and a second rearview mirror assemblies, wherein the first rearview mirror assembly includes a first rearview mirror and a first electrochromic unit for changing a reflection rate of the first rearview mirror in response to a first voltage applied thereto, and the second rearview mirror assembly includes a second rearview mirror and a second electrochromic unit for changing a reflection rate of the second rearview mirror in response to a second voltage applied thereto. The light-responsive control device includes a first photo-sensor disposed at a front side of the first rearview mirror for generating a first signal in response to an intensity of a forward light reaching the first rearview mirror; a second photo-sensor disposed at a back side of the first rearview mirror for generating a second signal in response to an intensity of a rear light reaching the first rearview mirror; a third photo-sensor disposed at a back side of the second rearview mirror for generating a third signal in response to an intensity of a rear light reaching the second rearview mirror; a discriminating circuit electrically connected to the first, second and third photo-sensors, generating a reference signal in response to the first signal, generating a first adjusting signal in response to a comparing result of the second signal and the reference signal, and generating a second adjusting signal in response to a comparing result of the third signal and the reference signal; a first charge/discharge unit electrically connected to the discriminating circuit and the first electrochromic unit for providing a first variable drive voltage for the first electrochromic unit in response to the first adjusting signal; and a second charge/discharge unit electrically connected to the discriminating circuit and the second electrochromic unit for providing a second variable drive voltage for the second electrochromic unit in response to the second adjusting signal.

Preferably, the light-responsive control device further includes a voltage source for providing an initial voltage signal; and a voltage-reducing unit electrically connected between the voltage source, and the first and second charge/discharge units for reducing the initial voltage signal to a range suitable for driving the first and second electrochromic units.

Preferably, the light-responsive control device further includes a fourth photo-sensor disposed at a back side of a third rearview mirror of a third rearview mirror assembly for generating a fourth signal in response to an intensity of a rear light reaching the third rearview mirror, wherein the discriminating circuit is further electrically connected to the fourth photo-sensor, and generates a third adjusting signal in response to a comparing result of the fourth signal and the reference signal; and a third charge/discharge unit electrically connected to the discriminating circuit and a third electrochromic unit of the third rearview mirror assembly for providing a third variable drive voltage for the third electrochromic unit in response to the third adjusting signal.

In an embodiment, the discriminating circuit includes a first comparing unit electrically connected to the first photo-sensor for comparing the first signal with a third predetermined signal to determine which of a first and a second predetermined signals to serve as the reference signal; a second comparing unit electrically connected to the second photo-sensor and the first comparing unit for comparing the second signal with the reference signal to generate the first adjusting signal; a third comparing unit electrically connected to the third photo-sensor and the first comparing unit for comparing the third signal with the reference signal to generate the second adjusting signal; and a fourth comparing unit electrically connected to the fourth photo-sensor and the first comparing unit for comparing the fourth signal with the reference signal to generate the third adjusting signal.

A third aspect of the present invention relates to a further light-responsive control device of an electrochromic rearview mirror system of a vehicle. The electrochromic rearview mirror system includes a first rearview mirror and a first electrochromic unit for changing a reflection rate of the first rearview mirror in response to a voltage applied thereto. The light-responsive control device includes a first photosensor disposed at a front side of the first rearview mirror for generating a first signal in response to an intensity of a forward light reaching the first rearview mirror; a second photo-sensor disposed at a back side of the first rearview mirror for generating a second signal in response to an intensity of a rear light reaching the first rearview mirror; a discriminating circuit electrically connected to the first and second photo-sensors, generating a reference signal in response to the first signal, and generating a first adjusting signal in response to a comparing result of the second signal and the reference signal; a reflectance-adjusting unit for selecting a reflection-rate range of the first electrochromic unit according to a user's option; and a drive circuit electrically connected to the discriminating circuit, the reflectance-adjusting unit and the first electrochromic unit for providing a first variable drive voltage for the first electrochromic unit in response to the first adjusting signal to result in a reflection rate within the reflection-rate range.

In an embodiment, the reflectance-adjusting unit includes a variable resistor electrically connected to the drive circuit and the first electrochromic unit.

Preferably, the reflection-rate range is about 55%~8% for daytime driving, and about 85%~8% for nighttime driving. More preferably, the reflection-rate range suitable for nighttime driving is about 78%~8%.

Preferably, the light-responsive control device further includes a third photo-sensor disposed at a driver's side outside the vehicle for generating a third signal in response to an intensity of a rear light reaching a second rearview mirror of the electrochromic rearview mirror system; and a fourth photo-sensor disposed at a passenger's side outside the vehicle for generating a fourth signal in response to an intensity of a rear light reaching a third rearview mirror of the electrochromic rearview mirror system; wherein the discriminating circuit is further electrically connected to the third and fourth photo-sensors, and generates a second adjusting signal in response to a comparing result of the third signal and the reference signal, and a third adjusting signal in response to a comparing result of the fourth signal and the reference signal, and the drive circuit provides a second and a third variable drive voltages for the second and third electrochromic units in response to the second and third adjusting signals, respectively. The discriminating circuit includes a first comparing unit electrically connected to the first photo-sensor for comparing the first signal with a third predetermined signal to determine which of the first and second predetermined signals to serve as the reference signal; a second comparing unit electrically connected to the second photo-sensor and the first comparing unit for comparing the second signal with the reference signal to generate the first adjusting signal; a third comparing unit electrically connected to the third photo-sensor and the first comparing unit for comparing the third signal with the reference signal to generate the second adjusting signal; and a fourth comparing unit electrically connected to the fourth photo-sensor and the first comparing unit for comparing the fourth signal with the reference signal to generate the third adjusting signal.

In another embodiment that the drive circuit includes three charge/discharge units electrically connected between the second, third and fourth comparing units and the first, second and third electrochromic units for charging/discharging the first, second and third electrochromic units in response to the first, second and third adjusting signals, respectively, the reflectance-adjusting unit may include three variable resistors electrically connected to the three charge/discharge units, respectively, for separately determining the reflection-rate ranges of the first, second and third electrochromic units.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3:
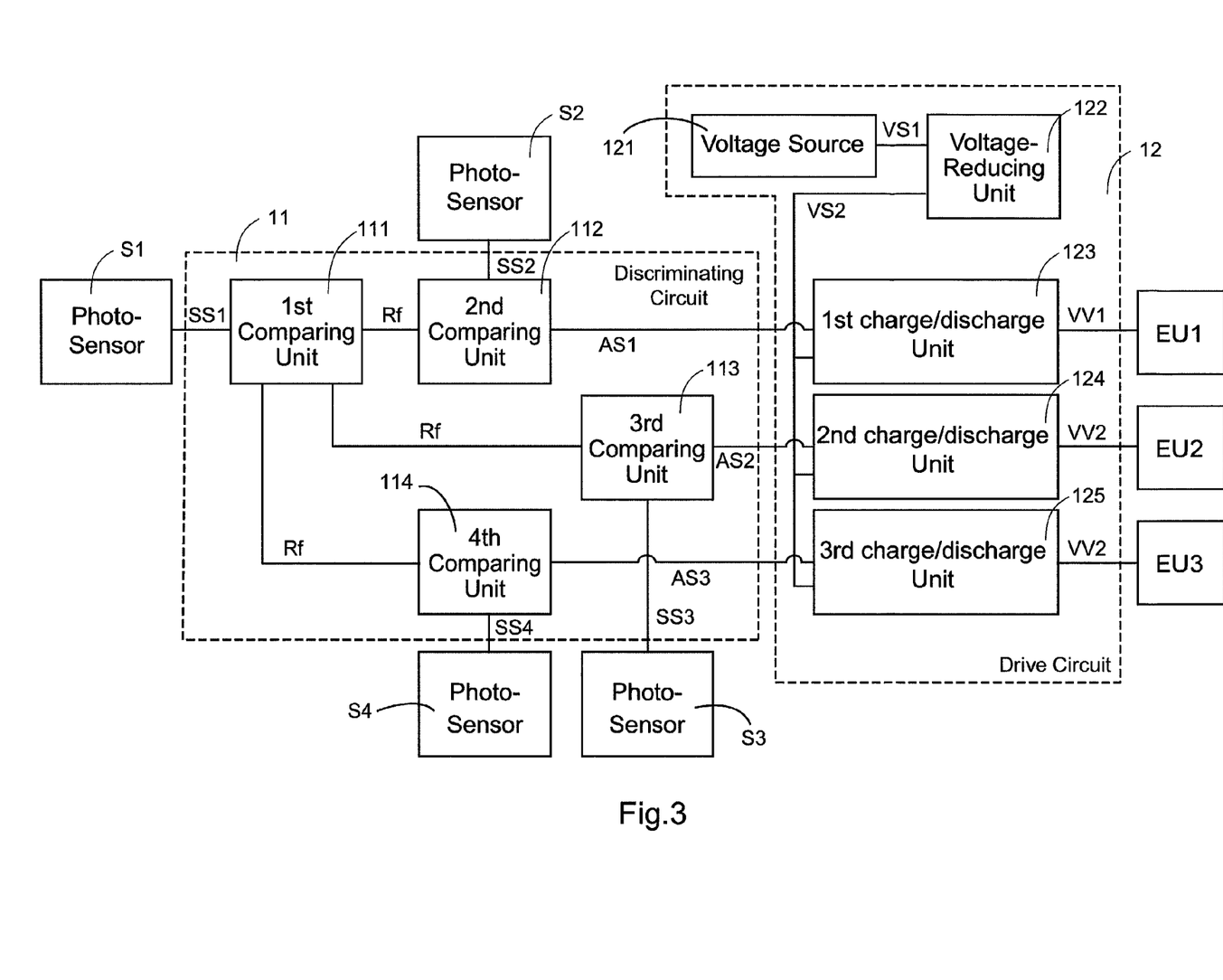
FIG. 3 is a schematic block diagram showing a preferred embodiment of a control device of an electrochromic rearview mirror system according to the present invention.
Figure 4:
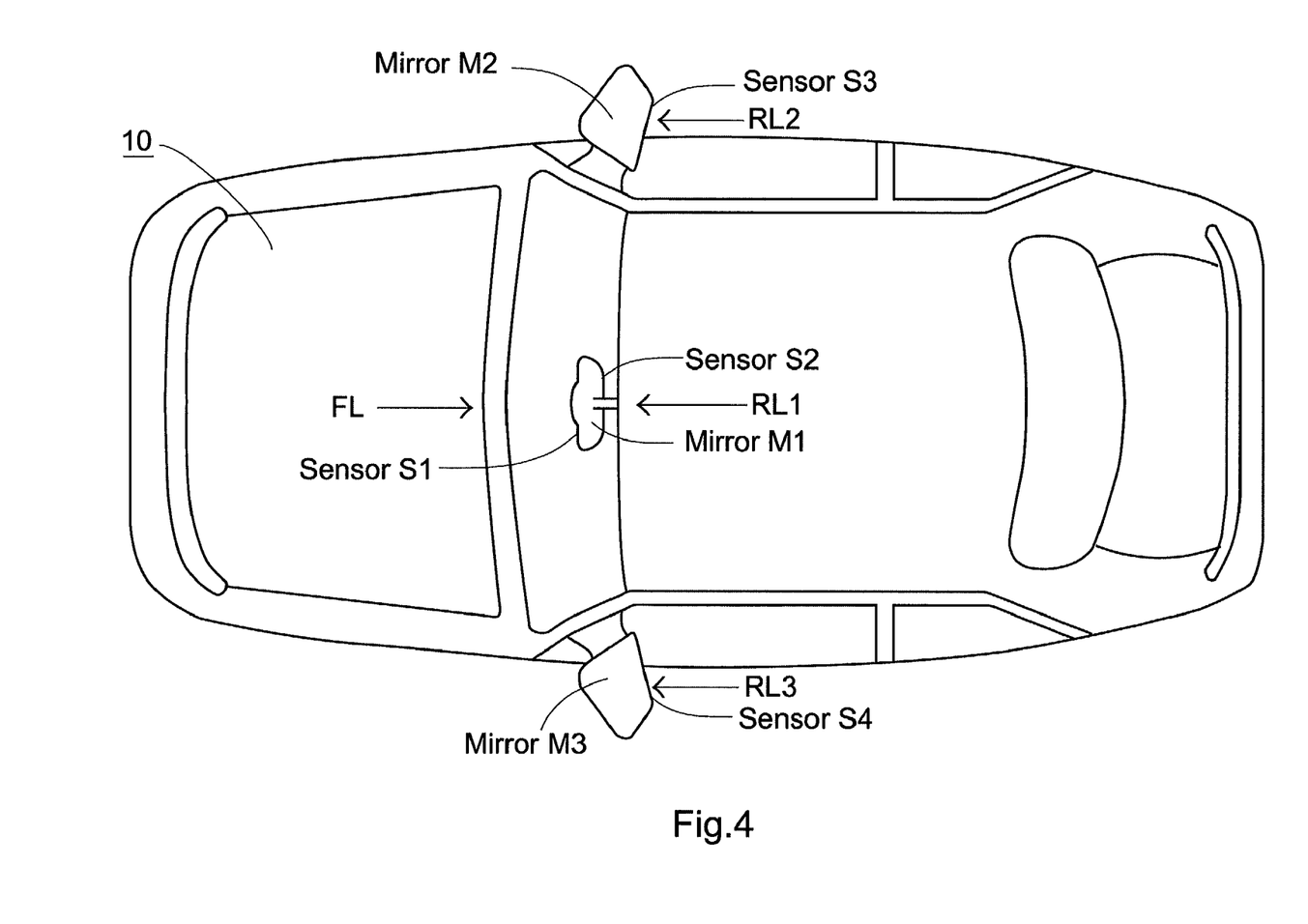
FIG. 4 is a schematic top view of a vehicle showing the arrangement of the rearview mirror system according to the present invention.

Please refer to FIG. 3 which is a schematic block diagram showing a preferred embodiment of a control device of an electrochromic rearview mirror system according to the present invention. The control device includes a first, a second, a third and a fourth photo-sensors S1, S2, S3 and S4 which are arranged on a vehicle 10 as shown in FIG. 4, a discriminating circuit 11 including a first, a second, a third and a fourth comparing units 111, 112, 113 and 114, a drive circuit 12 including a voltage source 121, a voltage-reducing unit 122, and a first, a second and a third charge/discharge units 123, 124 and 125. The first, a second and a third charge/discharge units 123, 124 and 125 are electrically connected to a first, a second and a third electrochromic units EU1, EU2 and EU3 which are mounted inside three rearview mirror assemblies, respectively. Referring to FIG. 4, the first photo-sensor S1 is disposed at a front side of an interior rearview mirror M1 for generating a first signal SS1 in response to an intensity of a forward light FL reaching the rearview mirror M1. The second photo-sensor S2 is disposed at a back side of the interior rearview mirror M1 for generating a second signal SS2 in response to an intensity of a rear light RL1 reaching the rearview mirror M1. The third photo-sensor S3 is disposed at a back side of an exterior mirror M2 at the driver's side for generating a third signal SS3 in response to an intensity of a rear light RL2 reaching the rearview mirror M2. The fourth photo-sensor S4 is disposed at a back side of another exterior mirror M3 at a passenger's side for generating a fourth signal SS4 in response to an intensity of a rear light RL3 reaching the rearview mirror M3. The first, second, third and fourth photo-sensors S1, S2, S3 and S4 are electrically connected to the first, second, third and fourth comparing units 111, 112, 113 and 114 of the discriminating circuit 11. The second, third and fourth comparing units 112, 113 and 114 are further electrically connected to the first comparing unit 111. The comparing unit 111 compares the first signal SS1 with a threshold level, and chooses one of two base levels as a reference level Rf according to the comparing result. Once the reference level Rf is determined, the second, third and fourth signals SS2, SS3 and SS4 are compared with the reference level by the comparing units 112, 113 and 114, respectively, to obtain a first, a second and a third adjusting signal AS1, AS2 and AS3. As known, if the level of any of signals SS2, SS3 and SS4 is higher than the reference level Rf, the corresponding adjusting signal will trigger the corresponding charge/discharge unit to apply a voltage VV1 or VV2 or VV3 to the corresponding electrochromic unit. The voltage is variable according to the compared difference. For example, if SS2>Rf, SS3<Rf and SS4<Rf, the mirror M1 will be the only mirror having a changed color, and the other two mirrors M2 and M3 remain the original colors. The greater the difference between SS2 and Rf, the deeper the color of the mirror M1.

An example is given as follows to describe the operation of the discriminating circuit. The signal SS1 is compared with a threshold level for distinguishing daytime and nighttime. Generally, an intensity value ranged between 20~100 Lux, e.g. 50 Lux, can be used as the threshold value. If the signal SS1 is higher than the threshold level, it is determined to be daytime, and a relatively high predetermined level is outputted as the reference level. On the contrary, if the signal SS1 is no higher than the threshold level, it is determined to be nighttime, and a relatively low predetermined level is outputted as the reference level. Then the signals SS2, SS3 and/or SS4 are compared with the reference level to determined whether a glaring situation occurs and optionally change the colors of the mirrors M1, M2 and/or M3. For example, when the difference between the signal SS2, SS3 or SS4 and the reference level is about 0.7 volts, the color of the corresponding mirror will be light green. When the difference between the signal SS2, SS3 or SS4 and the reference level increases to about 0.8 volts, the color of the corresponding mirror will be green. Further, when the difference between the signal SS2, SS3 or SS4 and the reference level is up to about 1.5 volts, the color of the corresponding mirror will be deep green.

It is understood that the variable voltages VV1, VV2 and VV3 are provided by the voltage source 121. The voltage source may be the ignition or the vehicle battery voltage VS1 which is about ten or tens of volts. Alternatively, the voltage source may be an independent battery voltage. The voltage-reducing unit 122 reduces the voltage VS1 to a range VS2 suitable for driving the electrochromic operation of the rearview mirror system. The range of VS2 is about 0~3.5 volts, and preferably 0~2 volts.

According to the above-mentioned embodiment, the three mirrors M1, M2 and M3 can be independently controlled for responding to various glaring situations.

Figure 5:
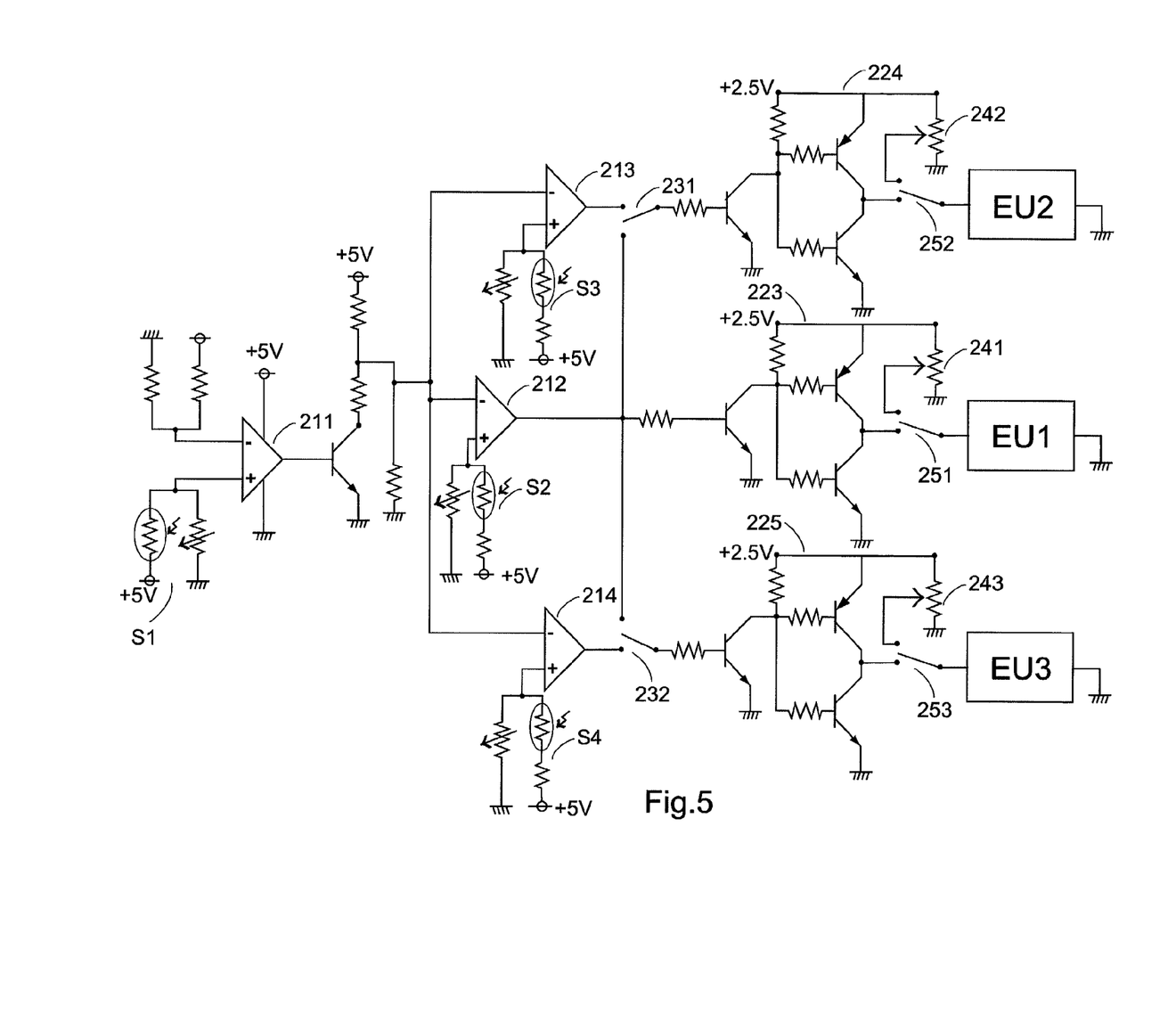
FIG. 5 is a circuit diagram showing another preferred embodiment of a control device of an electrochromic rearview mirror system according to the present invention.

Please refer to FIG. 5 which is a circuit diagram showing another preferred embodiment of a control device of an electrochromic rearview mirror system according to the present invention. Similar to the embodiment of FIG. 3, the control device of this embodiment includes a first, a second, a third and a fourth photo-sensors S1, S2, S3 and S4, a first, a second, a third and a fourth comparing units 211, 212, 213 and 214, and a first, a second and a third charge/discharge units 223, 224 and 225. Each of the photo-sensors includes a photo-responsive resistor and a variable resistor as shown. The variable resistor is provided for finely tuning the photo-responsive resistor.

In addition, the control device includes two switches 231 and 232 between the comparing unit 213 and the charge/discharge unit 242, and the comparing unit 214 and the charge/discharge unit 243, respectively. When the switches 231 and 232 allows the charge/discharge units 242 and 243 to be conducted with the comparing units 213 and 214, respectively, the three electrochromic units EU1, EU2 and EU3 can be can be independently controlled, as mentioned above. On the other hand, by conducting both of the charge/discharge units 242 and 243 with the comparing unit 212 via the switches 231 and 232, the three electrochromic units EU1, EU2 and EU3 are synchronously controlled.

Further, three variable resistors 241, 242 and 243 are electrically connected between the charge/discharge unit 223 and the electrochromic unit EU1, the charge/discharge unit 224 and the electrochromic unit EU2, and the charge/discharge unit 225 and the electrochromic unit EU3, respectively. By independently manipulating the variable resistors 241, 242 and 243, the reflection-rate ranges for the three mirrors M1, M2 and M3 can be separately set. For example, by applying aluminum, silver or $TiO_2+SiO_2$ to the electrochromic unit as a reflective layer, the initial reflection rate of each of the mirrors can be increased to about 78% or above which is higher than that of a conventional rearview mirror using chromium as the reflective layer. The conventional initial reflection rate is about 55%. By adjusting the switches 251, 252 and/or 253, and adjusting the variable resistors 241, 242 and/or 243, the reflection rates of the corresponding mirrors can have different initial reflection rates or maximum reflection rates, e.g. 55% and 78% and any other suitable reflection rate therebetween. For example, in daytime, the initial reflection rate can be adjusted to 55%, so the range of the reflection rate is from about 55% to about 8%. On the other hand, in nighttime, the initial reflection rate can be adjusted to 78%, so the range of the reflection rate is from about 78% to about 8%. It is understood that the reflection rate can be adjusted manually or automatically in response to the comparing result of the comparing unit 211 to determine whether it is daytime or nighttime.

From the above illustration, it is clear that the light-responsive control device of present invention covers but distinguishes the glare situations at daytime and nighttime. In addition, the colors or reflection rates of the interior and exterior rearview mirrors can be independently controlled according to various glaring situations. Moreover, each of the rearview mirrors is allowed to have an adjustable initial reflection rate so that the reflection rates of the rearview mirrors at night can be properly compensated.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light-responsive control device of an electrochromic rearview mirror system of a vehicle, said electrochromic rearview mirror system including first, second, and third rearview mirrors and first, second, and third electrochromic units for changing a reflection rate of said first, second, and third rearview mirrors in response to voltages respectively applied thereto, and said light-responsive control device comprising:

a first photo-sensor disposed at a front side of said first rearview mirror for generating a first signal in response to an intensity of a forward light reaching said first rearview mirror;

a second photo-sensor disposed at a back side of said first rearview mirror for generating a second signal in response to an intensity of a rear light reaching said first rearview mirror;

a third photo-sensor disposed at a driver's side outside said vehicle for generating a third signal in response to an intensity of rear light reaching said second rearview mirror of said electrochromic rearview mirror system;

a fourth photo-sensor disposed at a driver's side outside said vehicle for generating a fourth signal in response to an intensity of rear light reaching said third rearview mirror of said electrochromic rearview mirror system;

a discriminating circuit electrically connected to said first, second, third, and fourth photo-sensors, generating a reference signal in response to said first signal, and generating first, second, and third adjusting signals in response to respective comparing results of said second, third, and fourth signals with said reference signal, wherein said discriminating circuit further comprises:

a first comparing unit electrically connected to said first photo-sensor for comparing said first signal with a third predetermined signal to determine which of said first and second predetermined signals to serve as said reference signal;

a second comparing unit electrically connected to said second photo-sensor and said first comparing unit for comparing said second signal with said reference signal to generate said first adjusting signal;

a third comparing unit electrically connected to said third photo-sensor and said first comparing unit for comparing said third signal with said reference signal to generate said second adjusting signal; and a fourth comparing unit electrically connected to said fourth photo-sensor and said first comparing unit for comparing said fourth signal with said reference signal to generate said third adjusting signal;

a reflectance-adjusting unit comprising three variable resistors coupled to said first, second, and third electrochromic units, respectively for independently selecting reflection-rate ranges of said first, second, and third electrochromic units according to user's options;

a drive circuit electrically connected to said discriminating circuit, said reflectance-adjusting unit and said first, second, and third electrochromic units for providing first, second, and third variable drive voltages for said first, second, and third electrochromic units in response to said first, second, and third adjusting signals to result in reflection rates within said reflection-rate ranges;

wherein said drive circuit includes three charge/discharge units electrically connected between said second, third and fourth comparing units and said first, second and third electrochromic units for charging/discharging said first, second and third electrochromic units in response to said first, second and third adjusting signals, respectively.

2. A light-responsive control device of an electrochromic rearview mirror system of a vehicle, said electrochromic rearview mirror system including first, second and third rearview mirrors and first, second and third electrochromic units for changing reflection rate of said first, second and third rearview mirrors in response to voltages respectively applied thereto, and said light-responsive control device comprising:

a first photo-sensor disposed at a front side of said first rearview mirror for generating a first signal in response to an intensity of a forward light reaching said first rearview mirror;

a second photo-sensor disposed at a back side of said first rearview mirror for generating a second signal in response to an intensity of a rear light reaching said first rearview mirror;

a third photo-sensor disposed at a driver's side outside said vehicle for generating a third signal in response to an intensity of a rear light reaching said second rearview mirror of said electrochromic rearview mirror system;

a fourth photo-sensor disposed at a passenger's side outside said vehicle for generating a fourth signal in response to an intensity of a rear light reaching said third rearview mirror of said electrochromic rearview mirror system;

a discriminating circuit, comprising:

a first comparing unit electrically connected to said first photo-sensor for comparing said first signal with a third predetermined signal to determine which of said first and second predetermined signals to serve as a reference signal;

a second comparing unit electrically connected to said second photo-sensor and said first comparing unit for comparing said second signal with said reference signal to generate a first adjusting signal;

a third comparing unit electrically connected to said third photo-sensor and said first comparing unit for comparing said third signal with said reference signal to generate a second adjusting signal; and a fourth comparing unit electrically connected to said fourth photo-sensor and said first comparing unit for comparing said fourth signal with said reference signal to generate a third adjusting signal;

a reflectance-adjusting unit comprising three variable resistors coupled to said first, second and third electrochromic units, respectively, for independently selecting reflection-rate ranges of said first, second and third electrochromic units according to user's options;

a drive circuit comprising three charge/discharge units electrically connected to said second, third and fourth comparing units, said first, second and third electrochromic units and said three variable resistors for charging/discharging said first, second and third electrochromic units in response to said first, second and third adjusting signals, respectively, to result in reflection rates within said reflection-rate ranges.

3. The light-responsive control device according to claim 2 wherein said reflectance-adjusting unit includes a variable resistor electrically connected to said drive circuit and said first electrochromic unit.

4. The light-responsive control device according to claim 2 wherein said reflection-rate range is about 55%~8% for a first option, and about 85%~8% for a second option.

* * * * *